United States Patent [19]
Feutrel

[11] Patent Number: 4,587,092
[45] Date of Patent: May 6, 1986

[54] NUCLEAR REACTOR FUEL ASSEMBLY
[75] Inventor: Claude Feutrel, Vauhallan, France
[73] Assignee: Commissariat a l'Energie Atomique, Paris, France
[21] Appl. No.: 735,720
[22] Filed: May 20, 1985

Related U.S. Application Data
[63] Continuation of Ser. No. 469,119, Feb. 23, 1983, abandoned.

[30] Foreign Application Priority Data
Mar. 4, 1982 [FR] France .................. 8203608

[51] Int. Cl.⁴ .................. G21C 3/34; G21C 3/32
[52] U.S. Cl. .................. 376/438; 376/445; 376/446
[58] Field of Search .................. 376/285, 286, 362, 365, 376/433, 434, 438, 440, 441, 442, 445, 446, 448, 451

[56] References Cited
U.S. PATENT DOCUMENTS

| | | | |
|---|---|---|---|
| 3,015,616 | 1/1962 | Sturtz et al. | 376/440 |
| 3,169,097 | 2/1965 | Meyers | 376/434 |
| 3,354,045 | 11/1967 | Macfall et al. | 376/440 |
| 3,379,618 | 4/1968 | Frisch | 376/451 |
| 3,389,056 | 6/1968 | Frisch | 376/442 |
| 3,769,158 | 10/1973 | Winders | 376/440 |
| 3,770,583 | 11/1973 | Klumb et al. | 376/438 |
| 3,791,466 | 2/1974 | Patterson et al. | 376/442 |
| 3,920,516 | 11/1975 | Kmonk et al. | 376/441 |
| 3,954,560 | 5/1976 | Delafosse et al. | 376/352 |
| 4,391,771 | 7/1983 | Anthony | 376/440 |

FOREIGN PATENT DOCUMENTS

| | | | |
|---|---|---|---|
| 1075231 | 2/1960 | Fed. Rep. of Germany | 376/285 |
| 1536257 | 7/1968 | France | 376/438 |
| 2049108 | 3/1971 | France | 376/438 |
| 8119483 | 10/1981 | France | 376/438 |

Primary Examiner—Charles T. Jordan
Assistant Examiner—Richard W. Wendtland
Attorney, Agent, or Firm—Kerkam, Stowell, Kondracki & Clarke

[57] ABSTRACT

Water-cooled nuclear reactor fuel assembly of the type comprising two end pieces, respectively an upper end piece and a lower end piece, said end pieces having openings for the circulation of the light cooling water, the spacing grids made from a single metal have a relaxation effect under irradiation and are constituted by two groups of perpendicular plates, said grids defining cavities, each of which is traversed either by a fuel rod, or by a connecting rod, said spacing grids being distributed along the connecting rods, the walls of each cavity having bearing members for holding in place the fuel rods, wherein the fuel rods are jointed to an end piece and wherein means are provided for maintaining the group of grids against one of the upper or lower end plates, both during the operation of the reactor and when it is shut down.

12 Claims, 15 Drawing Figures

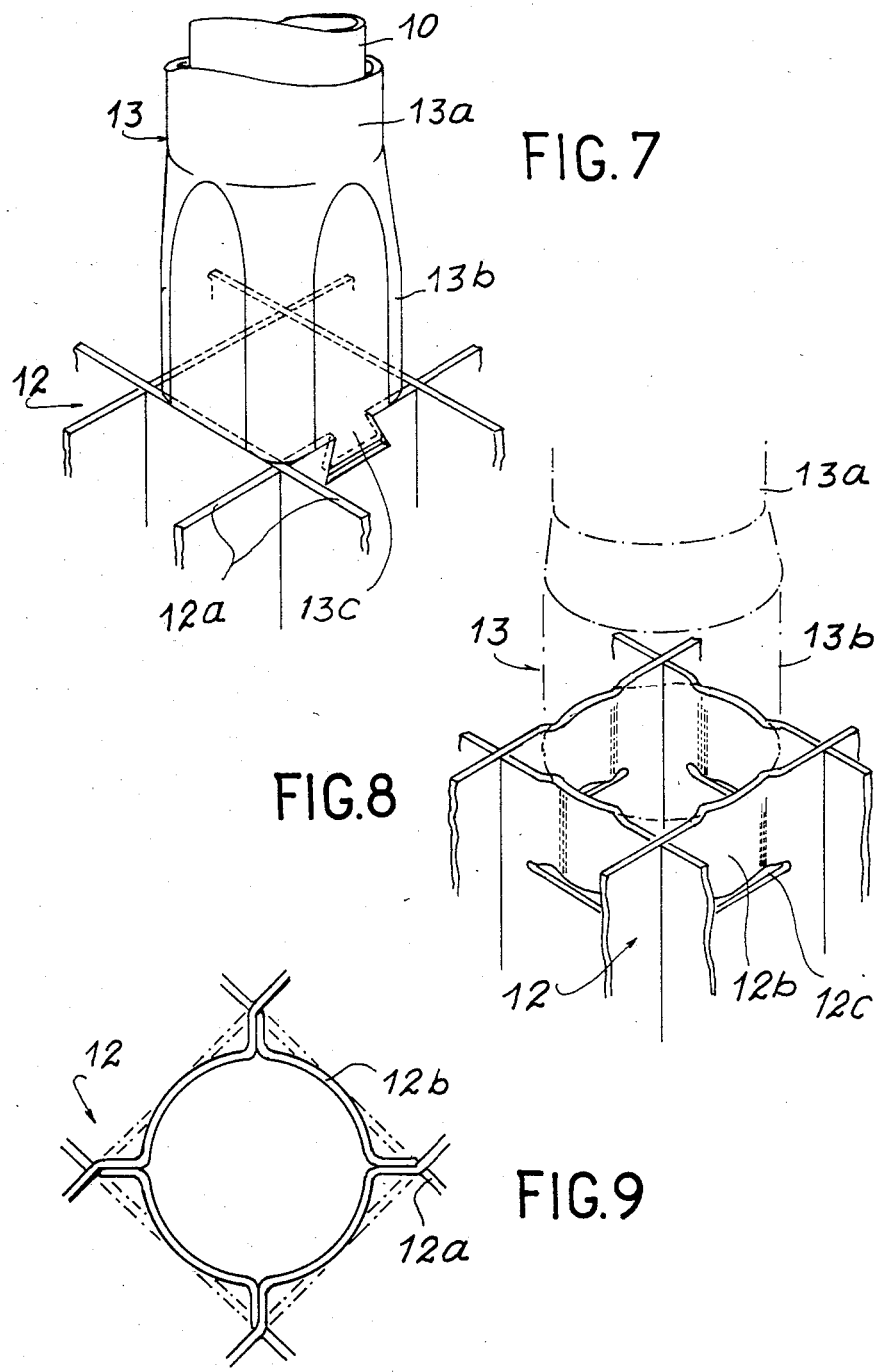

NUCLEAR REACTOR FUEL ASSEMBLY

This is a continuation of application Ser. No. 469,119 filed Feb. 23, 1983, now abandoned.

BACKGROUND OF THE INVENTION

The present invention relates to a nuclear reactor fuel assembly, whereof the rods are fixed to an end piece and in which the system of grids is kept supported against one of the end pieces. The invention relates to nuclear reactor fuel assemblies and particularly those used for water-cooled reactors.

Each assembly of this type extends over a length of several metres between a lower inner plate and an upper inner plate belonging to the equipment within the reactor vessel. It rests on the lower inner plate and is positioned by centering pins forming an integral part of the two aforementioned plates connected to the reactor vessel. It comprises a rigid mechanical frame formed by two end pieces, namely the upper and lower end pieces, provided with openings permitting the passage of the cooling water circulating from bottom to top, as well as a certain number of connecting rods ensuring the stability of the system by being fixed to the said end pieces. The supporting and spacing of the fuel rods is brought about along each assembly, by a certain number of supporting grids connected to the connecting rods defining cavities having a square cross-section.

Furthermore, in order to permit the expansion in operation of the fuel rods, it is necessary to leave a clearance between the rods and at least one of the end pieces. In addition, as the assembly is exposed to a flow of cooling water, which circulates from bottom to top in the reactor core, it is necessary to avoid, as a function of the type of assembly, either the flying off of said assembly, or the flying off of the grids and the fuel rods under the effect of the cooling water circulation.

Numerous embodiments of nuclear reactor fuel assemblies are known providing a solution to the aforementioned problems, for example, those described in French Pat. Nos. 1,536,257 and 2,049,108 granted to the Westinghouse Electric Corporation. French Pat. No. 1,536,257 relates to the design of a framework for a fuel assembly equipped with a group of fuel rods sliding in the connecting rods. The latter are made from steel and the supporting grids are welded thereto and are made from Inconel. The fuel rods are supported by springs and bosses stamped into the plates of the grids.

French Pat. No. 2,049,108 relates to the design of an assembly, whose connecting rods are made from Zircaloy, whilst the grids are made from Inconel. Due to the metallurgical incompatibility of these two metals, the connection between the grid and the connecting rod takes place by the interposing of a stainless steel sleeve hard soldered to the grid plates, which is then mechanically deformed together with the connecting rod.

According to another known construction, the spacing grids slide freely on the connecting rods. Only the lower grid is held on the lower end plate by a fly-off-prevention sleeve. In this case, the spacing grids are made from a single material, preferably Inconel, which ensures an adequate fastening to the fuel rods for the different grids to be supported and retained by means of the said fuel rods.

The fuel assembly according to the invention has homogeneous grids without joined springs and made from zircaloy, whose neutron absorption power is particularly low.

Attempts were firstly made to produce spacing grids entirely from Zircaloy by cutting in the walls, springs able to exert an adequate fixing force of the fuel rods to ensure the secure fixing between grids and fuel rods throughout the life of the assembly. However, tests have shown that this result could not be achieved due to the relaxation of Zircaloy under irradiation. At the end of a certain time, the fixing effect of the springs to the fuel rods slackens and it is no longer possible to ensure the fastening between the grids and the rods.

SUMMARY OF THE INVENTION

The present invention relates to a nuclear reactor fuel assembly using transverse spacing grids having no supporting function during operation and which comprises means able to prevent the flying off of fuel rods and grids under the effect of the circulation of the cooling water flow.

More specifically, the invention relates to a water-cooled nuclear reactor fuel assembly of the type comprising two end pieces, specifically an upper and a lower end piece, said end pieces having openings for the circulation of the cooling water, rigid connecting rods fixed by their ends respectively to the upper and lower end pieces, spacing grids distributed along the connecting rods and which define cavities traversed in each case by a fuel rod, the walls of each cavity having supporting members, which position the fuel rods, whereby the assembly is characterized in that the fuel rods are rendered integral with an end piece and the means maintain the system of grids in engagement with one of the upper or lower end pieces.

The said means can consist of the thrust exerted by the cooling water and in this case they are preferably supplemented by elastic means which, if appropriate, can prevent the drop by gravity of the assemblies, during the stoppage of the cooling fluid flow.

The operation of a fuel assembly according to the invention takes place in two successive phases.

At the start of the life of the assembly, the spacing grids are fixed to the fuel rods. Thus, the support points on these rods make it possible to ensure an adequate fixing force. Thus, the grids follow the expansion of the fuel rods, which moves them upwards.

During a second phase, there is a relaxation of the support points of the grids on the fuel rods, so that the grids slide along the rods. It is then that the means, particularly elastic means provided for maintaining the grids in place with respect to the one of the upper or lower end pieces come into action. These elastic means compensate for the slackening of the securing action of the grids on the rods. Nevertheless, as from this time, the spacing grids continue to provide the spacing of the fuel rods. Within each cavity, the fuel rods are braced without any clearance by the support points made in the walls of the partitions of the grid cavities. It is therefore necessary to ensure that the fuel rods do not fly off under the effect of the upward cooling fluid flow. According to the invention, this is brought about by making the fuel rods integral with the lower end piece.

Generally, the fuel rods are constituted by a sheath in which are introduced fissile and/or fertile fuel pellets. Each of the ends of the sheath is sealed by a plug.

Preferably, and according to one of the secondary features of the invention, the plugs of the fuel elements located at the end joined to an end plate are elongated and have at their end a cylindrical fitting provided with an annular groove, the corresponding end piece having a hole serving to receive the end fitting of the plug. This hole has a semi-toroidal annular groove in which is located a floating locking ring. Preferably, this hole is extended by a smaller diameter orifice permitting the circulation of the water.

According to a first embodiment of the invention, an elastic stress is exerted on the grids, which maintain the latter downwards, i.e. towards the lower end piece. According to this embodiment, the elastic means are constituted e.g. by a plurality of springs mounted on the connecting rods, said springs being secured at one of their ends and whose other end forces the grids downwards. More specifically, the fuel assembly according to the invention is characterized in that the means for engaging the spacing grids with one of the end pieces are constituted by rigid spacers mounted on the connecting rods and disposed between the grids, as well as their springs forcing each of the grids downwards.

Preferably, the springs are introduced onto a central rod and are fastened at one of their ends and to the said rod.

According to a second embodiment, there is an upward engagement of the spacing grids, i.e. against the upper end piece. Such an embodiment has the advantage that the elastic means no longer act, as in the first embodiment, against the upward flow of the cooling fluid and instead act in the same direction. Consequently, the force required is less, because the force exerted by the elastic means and that exerted by the cooling fluid act in the same direction. In this case, the springs merely have the function of maintaining the system of grids in place when the reactor is shut down, i.e. when the cooling fluid flow has stopped. It is then sufficient to have a single spring for each connecting rod, or even part of the connecting rod.

This embodiment has two variants. In both variants, springs are arranged around the connecting rods, between the lower end piece and the lower grid. According to the first variant, the force exerted by the springs is transmitted from the lower grid to the other grids by rigid spacers mounted on the connecting rods. Preferably, compensating springs are added between the upper grids and the upper end piece.

According to a second variant, the force exerted by the springs arranged on the connecting rods is transmitted from the lower grid to the other grids by elastic spacers.

BRIEF DESCRIPTION OF THE DRAWINGS

The invention is described in greater detail hereinafter relative to non-limitative embodiments and the attached drawings, wherein show:

FIG. 7 a perspective view showing the constructional details of a rigid spacer according to the invention.

FIG. 8 a perspective detail of another construction of a spacing grid and a rigid spacer according to the invention.

FIG. 9 a plan view of a special construction of the spacing grid of FIG. 8.

DETAILED DESCRIPTION OF THE INVENTION

Figure 1:
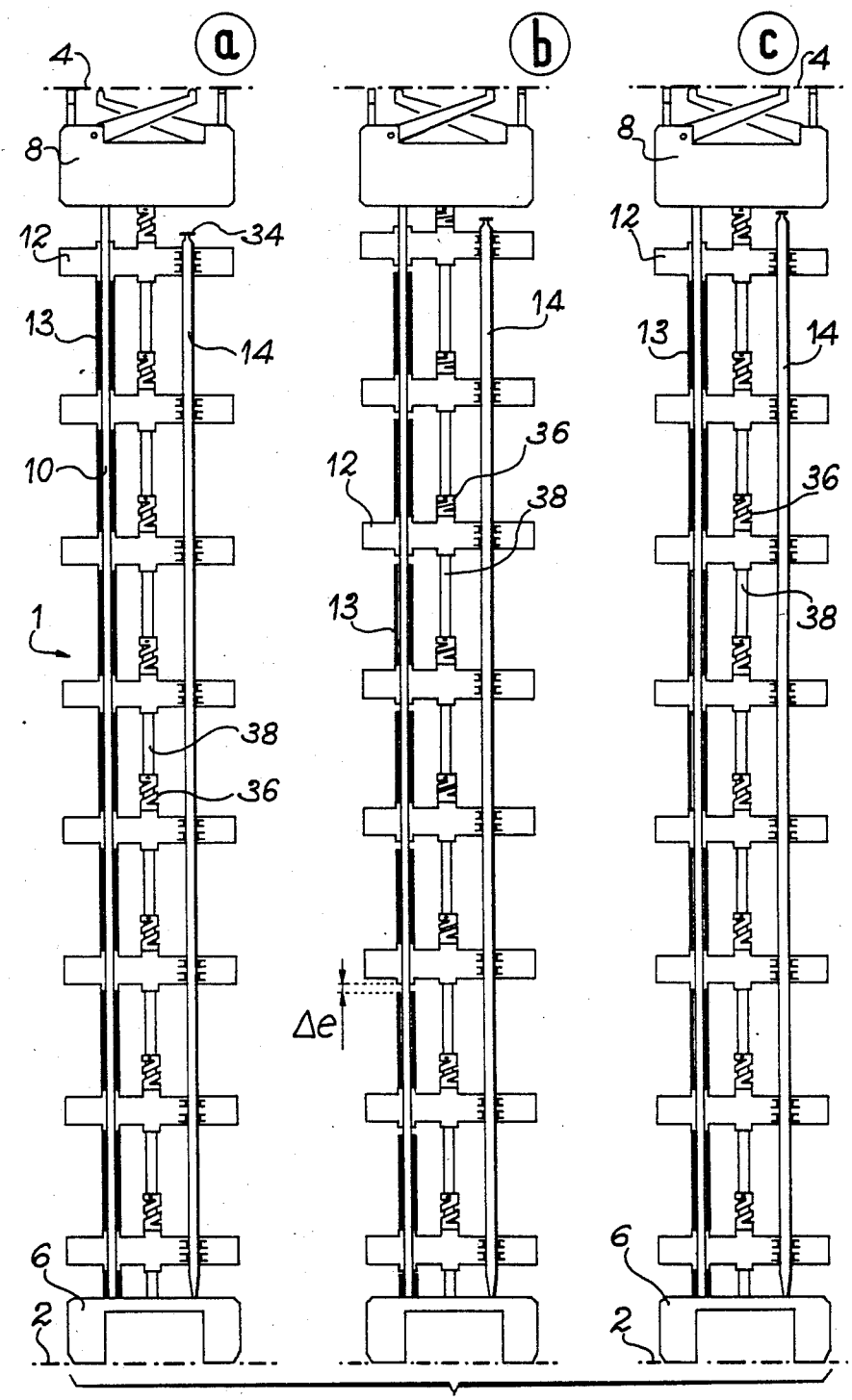
FIGS. 1a to 1c a first embodiment of the invention, in which the spacing grids are displaced towards the lower end piece.

FIG. 1 shows a first embodiment of the invention and consists of three views a, b and c representing a fuel assembly at different stages of its life.

As has been stated, assembly 1 is arranged between a lower core supporting plate 2 and an upper core supporting plate 4, represented in the drawings by a dotted mixed line, said plates belonging to the internal equipment of the reactor vessel. The assembly comprises a rigid mechanical frame formed from two end pieces, namely a lower end piece 6 and an upper end piece 8, provided with openings for the passage of the cooling water, which circulates from bottom to top. The connecting rods 10 ensure the stability of the system by their fixing to end pieces 6 and 8. Grids 12, distributed along the connecting rods 10 ensure the spacing of the fuel rods 14. The spacing of the different grids is ensured by rigid spacers 13.

Figure 4:
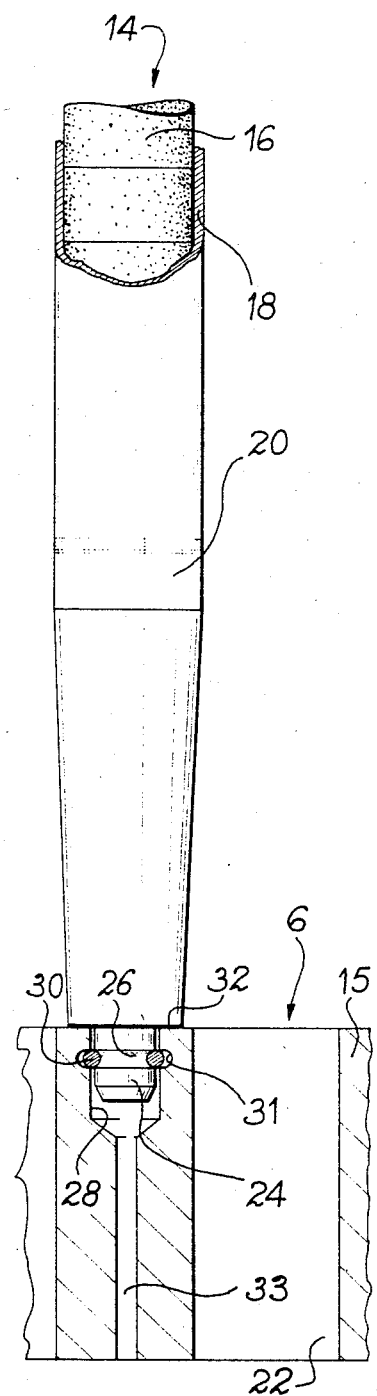
FIG. 4 a detail of a preferred method of joining the base of a fuel rod to the plate of the lower end piece.

The fuel rods 14, whereof only one is shown in FIG. 1 in order not to overload the drawing, generally comprises a metal sheath 18 FIG. 4 within which are stacked fissile and/or fertile pellets 16. Each of the ends of sheath 18 is terminated by a sealing plug 20. According to the invention, fuel rods 14 are joined to the lower end piece 6.

FIG. 4 shows the lower end of a fuel rod 14 and its joining to plate 15 of lower end piece 6. Plug 20 is elongated and profiled in such a way that it bears on plate 15 of lower end piece 16 between four water passage holes 22, but does not seal the latter. Its end has a cylindrical end fitting 24 with a semi-toroidal groove 26. Bore 28 in which is engaged end 24 has in the same way a semi-toroidal groove 31 facing groove 26, when the fuel rod is in place. A small diameter hole 33 extends bore 28 and permits the circulation of water. A retaining ring 30 is placed between the space defined by grooves 26 and 31. The bearing of the fuel rod on plate 14 is localized on a contact ring 32. There is a clearance between end fitting 24 and bore 28. Retaining ring 30 thus ensures that fuel rod 14 does not fly off by joining the latter to the end piece.

As can be gathered from FIG. 1, the upper plug has an end fitting 34 which can be fitted to a tension clamp for fitting rod 14 in spacing grids 12.

Rod 14 is fitted by freely introducing end 24 into bore 28 up to locking ring 30, a clearance existing between end fitting 24 and bore 28. An axial thrust of 0.5 to 1 daN must be exerted in order to introduce locking ring 30 into grooves 31 and make shoulder 32 bear against plate 15. In this position, end fitting 24 can only escape under an axial stress of the same magnitude as that necessary for fitting it. However, it has a certain freedom of displacement in the radial direction, which means that the grid still exerts a fuel rod spacing function.

As has been stated hereinbefore, the spacing grids 12 are made entirely from Zircaloy, for example being grids of the type described in French Patent Application No. 81 19483. Due to the particularly significant relaxation of this material, no spring ensuring an adequate securing of the fuel rods throughout the life of the assembly has been installed. The grid only has semi-rigid bearing points on the rods, which ensure the spacing of the latter and the cohesion of the system.

Figure 5:
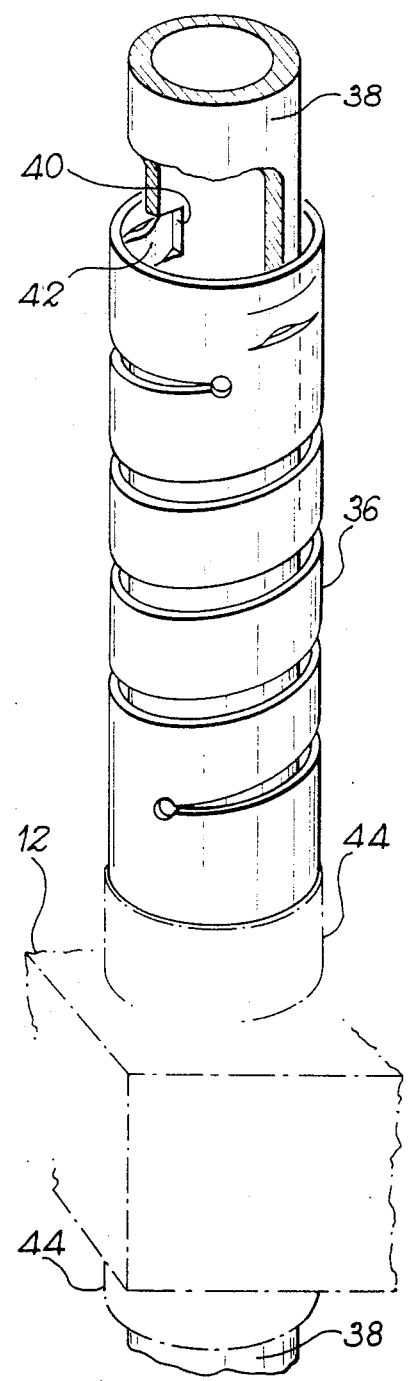
FIG. 5 a detail in perspective of the fixing of a spring to the central rod used in the first embodiment shown in FIG. 1.

According to the invention, assembly 1 has elastic means making it possible to force grids 12 towards one of the end pieces, in the present case the lower end piece 6. These means are constituted by springs 36, joined by one of their ends to the central instrumentation rod 38 and acting by their second end on the corresponding sleeve of each grid. FIG. 5 is a perspective view showing the detail of such a spring, made e.g from Inconel 718. Two rectangular notches 40 diametrically facing one another in the wall of the central instrumentation rod 38 has been provided. Spring 36 has been split or slit and deforms so as to introduce two tabs 42 into each of the windows 40. Thus, spring 36 is stopped in translation with respect to connecting rod 38. At its other end, it bears on sleeve 44 of grid 12, both being diagrammatically shown by dotted lines.

In FIG. 1a, assembly 1 is shown at the start of its life. In this stage, the semi-rigid bearing points on the rods ensure an adequate securing force to immobilize each of the grids 12 relative to the fuel rods 14. The spacing grids are consequently secured relative to the fuel rods by this force.

During the operation of the reactor shown in FIG. 1b, the fuel rods 14 expand under the effect of irradiation. The grids 12 follow the expansion of the fuel rods, which displaces them upwards, because the lower part of the fuel rods is fixed to the lower end piece 6. The upward displacement of grids 12 leads to a compression of each of the springs 36.

Thus, there is a clearance $\Delta$ e between each grid and the spacer 13 separating it from the grid placed in the immediately lower position, because sleeve 13 slides freely on connecting rod 10 and consequently rests on the lower grid.

During the life of the assembly, the Zircaloy relaxation phenomenon occurs. There is a slackening of the securing force of the semirigid bearing points on fuel rods 14. Due to the reduction of this force, grids 12 slide downwards under the action of the force exerted by springs 36. The downward displacement of grids 12 stops when the clearance $\Delta$ e which appeared at the start of the life of the assembly has been cancelled out, i.e. when all the grids bear against a spacer 13. The system of grids is then applied without clearance to the lower end piece 6 via spacers 13.

As has been stated, this makes it possible to prevent the flying off of the fuel rods and grids, whilst still using spacing grids made entirely of Zircaloy, i.e. without having to use for the springs a material having a high relaxation resistance, such as Inconel 718.

Figure 2:
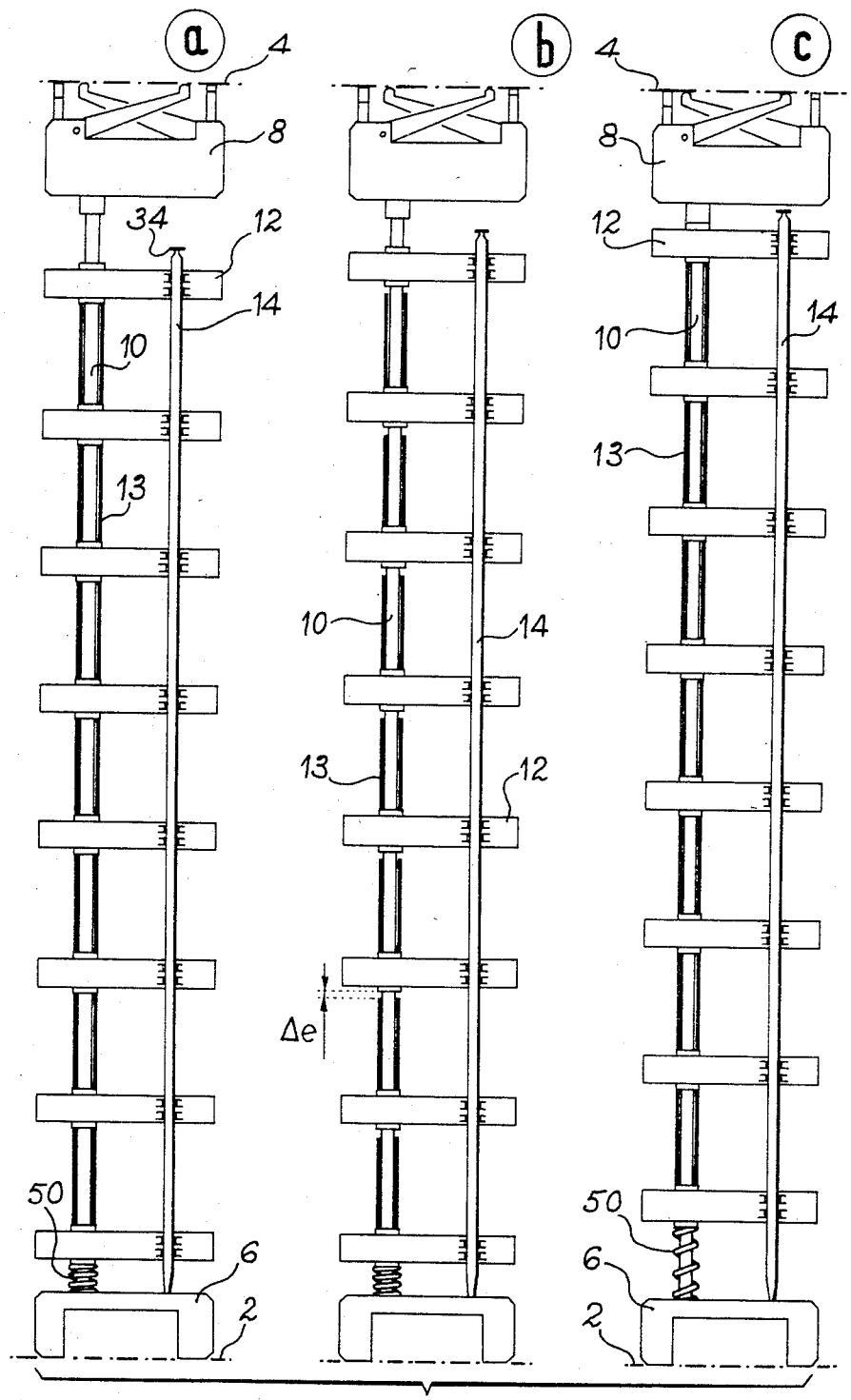
FIGS. 2a, 2b, 2c and 3a, 3b, 3c two variants of a second embodiment in which the spacing grids are elastically displaced towards the upper end piece.
Figure 3:
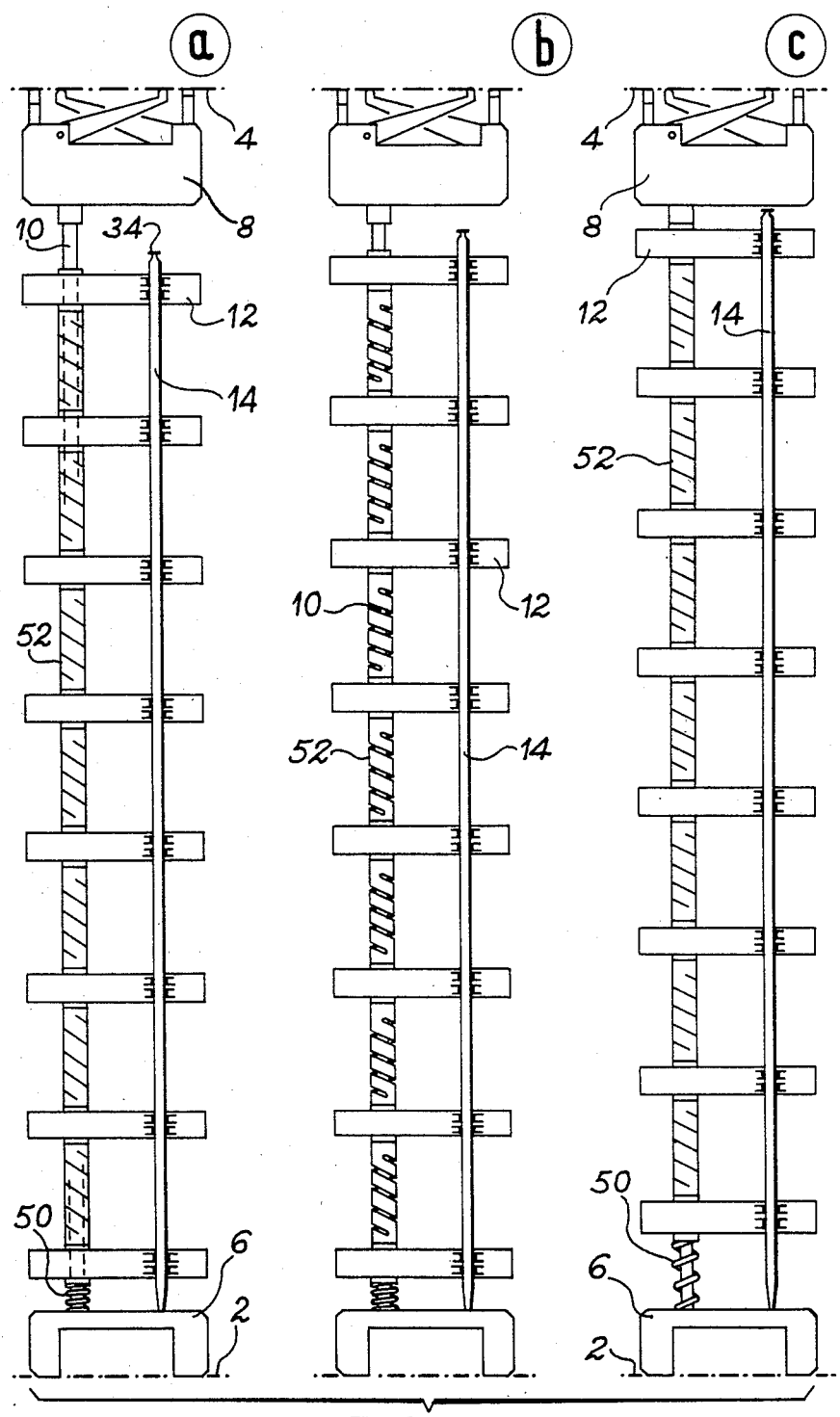

FIGS. 2 and 3 show two variants of a second embodiment of the invention, which differs from the first embodiment described relative to FIG. 1 in that the elastic means equipping the assembly exerts a force directed from bottom to top and not from top to bottom. The advantage of this embodiment is that the force exerted by the elastic means is lower, because it is exerted in the same direction as the cooling water flow and not in the opposite direction.

It is therefore possible to use one spring per connecting rod and to arrange the same at the lower end thereof, which simplifies the construction compared with that of FIGS. 1 and 5.

In the embodiment of FIG. 2, the elastic means are constituted by springs 50 arranged around the connecting rods 10. In the same way as in the case of the assembly of FIG. 1, rigid spacers 13 are arranged between the grids 12. The force exerted by springs 15 on the lower grid is then transmitted between the grids via said spacers 13.

FIG. 2a shows assembly 1 at the start of its life. As has been explained hereinbefore, at this stage the securing force of the semi-rigid supports 13 is adequate to maintain the grids in place with respect to the fuel rods 14.

FIG. 2b shows the assembly during its life. A certain expansion of rods 14 has taken place under the action of irradiation. As hereinbefore, grids 12 follow this expansion of the rods, because the securing force on the rods is still high. Thus, as explained with reference to FIG. 1, a clearance $\Delta$ e appears between the spacers and the grid positioned immediately above it.

FIG. 2c also shows the assembly during its life. As a result of the relaxation of the Zircaloy from which the spacing grids 12 are made, the securing force of the semi-rigid supports on the fuel rods has slackened. Thus, the system of grids has moved upwards under the action of the force exerted by the group of springs 50, as well as the upward force of the cooling water stream, said upward force alone being sufficient to obtain this result. Thus, the position shown in FIG. 2c is reached, in which the upper gird abuts against the upper end piece 8 and the clearances $\Delta$ e of FIG. 2b have been compensated. Thus, the system of grids bears against the upper end piece 8 and springs 50 are relaxed. One of the functions of springs 50 is to maintain the system of grids upwards during reactor shutdown. It is obviously possible to use any equivalent means.

According to a preferred variant, between the upper grid and the upper end piece are arranged compensating springs.

In the position of FIG. 2, these compressed springs only maintain the upper grids in place. Subsequently, they compensate the displacement of the grids and, in the position of FIG. 2c, their turns are made contiguous and form an abutment for the upper grid. As a function of the state of the material used and particularly the heat treatment applied thereto, it is possible to arrange the system of grids, from the outset, so as to bear against the upper end plate 8. In such a solution, the displacement of grids described in FIGS. 2a and 2b no longer occurs.

Figure 6:
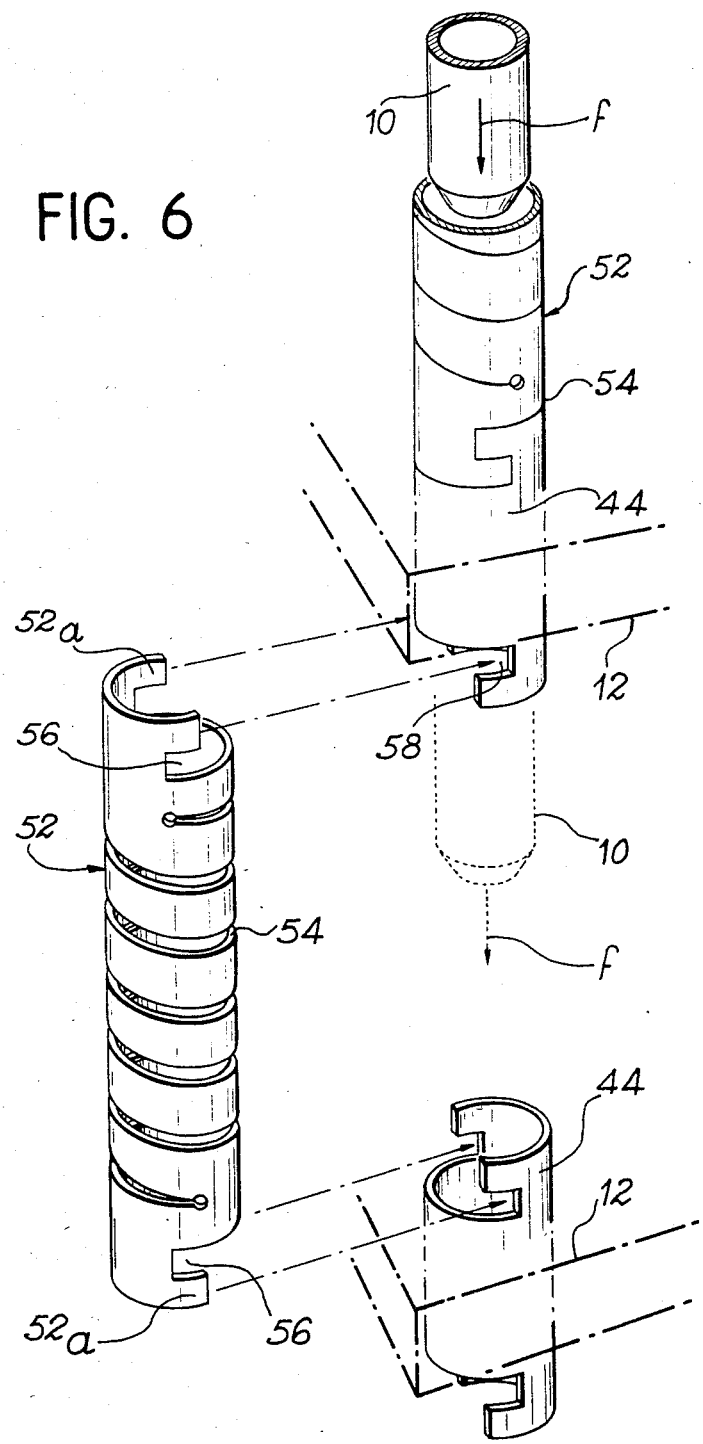
FIG. 6 a perspective view showing the constructional details of an elastic spacer used in the embodiment of FIG. 3 and the way in which it is fitted.

FIGS. 3a, b and c represent a variant of the second embodiment of the invention, in which the grids are forced against the upper end piece 8. Like the embodiment of FIG. 2, it has springs 50 wound around the connecting rods 10 and positioned between the lower end piece 6 and the lower grid of the assembly. The difference between these two variants is based on the spacers. In this case, the spacers are elastic and not rigid like spacers 13 shown in FIGS. 1 and 2. FIG. 6 is a perspective view giving details of such a spacer 52. It is in the form of a sleeve into which has been cut a helical slot 54 defining turns identical to those of a spring. In the free state, the turns of spacer 52 are contiguous as shown in FIG. 3a. When a tensile stress is exerted on ends 52a, the position shown in FIG. 6 is obtained. A notch 56 is formed at each end 52a for cooperating with an identical notch 58 made in sleeve 44 of each of the grids 12 shown in dotted mixed line for in FIG. 6.

The installation of the spacers 52 is shown. Firstly, end 52a of each elastic spacer 52 is introduced into notch 58 of each of the sleeves of grids 12. When this has taken place, connecting rod 10 is mounted, by sliding it in the spacers or in the sleeves of the grids in accordance with the direction of arrow f.

In FIG. 3a, as in FIGS. 1a and 2a, the bearing force of the semi-rigid bosses of rods 14 is adequate to maintain them in place with respect to the latter.

In FIG. 3b, under the action of the expansion of fuel rods 14, grids 12 follow said rods and are consequently displaced with respect to the connecting rods 10. The spacers 52 fixed to grids 12 at each of their ends assume the position in which the turns are spaced apart, as shown in FIG. 3. Thus, the elastic spacers exert a tensile stress on the grids, which tends to move them towards one another. However, this force is less than the frictional forces existing at the rigid support points on the rods and therefore, at this stage, the grids still remain stationary with respect to the fuel rods 14.

The relaxation of the Zircaloy has taken place in FIG. 3c, which represents assembly 1 during its life. The fastening of the rods has slackened, in such a way that the grids have moved close to one another under the action of the tensile action exerted by each of the elastic spacers 52, superimposed on the upward force of the cooling fluid. Thus, the group of grids has moved upwards and bears against the upper end piece 8. Thus, a position identical to that shown in FIG. 2c is reached, in which the springs 50 are relaxed.

The difference between the variants of FIGS. 2 and 3 is that in the latter, at no time is there a clearance between the spacers and the grids. This is due to the fact that the spacers are elastic and can absorb clearance $\Delta$ e, to which reference has been made with respect to FIGS. 1 and 2. This eliminates any vibration of the spacers during the operation of the reactor.

Moreover, this embodiment retains the aforementioned advantage of engaging the group of grids against the upper end piece, which reduces the force necessary, because it acts in the same direction as the force due to the cooling water flow. Thus, it is merely necessary to dimension springs 50 in such a way that they are able to maintain the grids and spacers in the position occupied by them in FIG. 3c during reactor shutdown.

In conventional manner, the fuel assembly grids can have sleeves arranged in cavities of the said grids traversed by the connecting rods. These sleeves are welded to the grids and rigid spacers 12 and bear on the ends of the grid sleeves.

The invention relates to a simpler construction of these grids, guided axially on the connecting rods, in which the sleeves are eliminated.

According to a first variant shown in FIG. 7, plates 12a of grid 12 have no extension. To ensure the contact between grid 12 and rigid spacer 13, the latter has a central part 13a, whose diameter slightly exceeds the external diameter of connecting rod 10 onto which it is mounted. In this way, spacer 13 slides on the connecting rod. Moreover, spacer 13 has on either side of the central part 13a, two end parts, whereof only one is shown in FIG. 7. Parts 13b are intended to bear on the edges of plates 12a, which constitute the spacing grids 12 of the assembly fuel rods. Thus, part 13b has a variable section. It is circular at the point where it is connected to the circular part 13a and its section varies until is becomes polygonal at the point where it bears on grid 12. This polygonal section has at least four opposite sides, which are parallel in pairs, and whose extensions intersect at right angles. For example, it can be a square section, octogonal section, or a square section with rounded angles, in the manner shown in FIG. 7.

To prevent spacer 13 from rotating about connecting rod 10, which would be prejudicial to its bearing on grid 12, the spacer is provided with means able to prevent a relative rotation of these two members. In the embodiment of FIG. 7, these means are constituted by a tenon 13c, which is placed in a mortise cut into one of the plates 12a forming the grid. No shaping is required on plates 12a of the grid, because the contact surface between spacer 13 and the latter is always adequate. This contact is permanently maintained during operation, as a result of means able to prevent the aforementioned rotation.

According to another variant shown in FIGS. 8 and 9, the central parts of plates 12a of grid 12, which form the four sides of a cavity traversed by a connecting rod 10 are shaped so as to have a substantially circular rounded form in their central part. This deformation of the plate can be made over the entire height of the latter or only over part thereof, as shown in FIG. 8. An oblong hole 12c is made, which limits the rounded section portion 12b. The rigid spacer 13, shown in dotted mixed line form in FIG. 8, has a central part 13a, whose internal diameter slightly exceeds the external diameter of connecting rods 10, as well as two end parts 13b, whereof only one is shown in FIG. 8. Part 13b has a final diameter corresponding to that of the rounded parts 12b of FIG. 12. Once the grid has been assembled, spacer 13 rests on the latter by parts 12b. The contact surface is less than the section of spacer 13, but is still adequate. It should be noted that there is no need to provide means for preventing the relative rotation of the spacer with respect to the grid, because the bearing zone has a symmetry of revolution.

The deformation can be more or less pronounced. Thus, it is possible to obtain a contact area forming a complete circle, as shown in FIG. 9. In this case, the bearing area of spacer 13 of grid 12 is increased.

This construction in no way reduces the water passage cross-section. Thus, it reduces the pressure drop around connecting rods 10. The engagement function of connecting rods 10 in the grid is maintained by slightly off centering the deformed parts 12b, which are thus applied to rods 10 with a pressure due to the local bending of the plate forming the grid. It should also be noted that this construction is simple, easy to realise and leads to a material saving. It requires no supplementary welding during the assembly of the grid.

It should be noted that with the constructions of the grid and the guide tubes described with reference to FIGS. 7 to 9, the bearing of the spacers on the grids provides an adequate surface for preventing the interpenetration of the materials as a result of the contact pressure. This bearing is maintained, even in the case of a possible separation of the contact surfaces.

I claim:

1. A water-cooled nuclear reactor fuel assembly comprising:
   upper and lower end pieces;
   connecting rods extending between said upper and lower end pieces, the ends of each connecting rod being fixed to the respective end piece;
   fuel rod spacing grids slidably fitted on and distrubuted along said connecting rods, said spacing grids having apertures through which said connecting rods pass and having fuel rod apertures, said spacing grids being formed entirely of a zirconium alloy of low neutron absorption cross section;

spacers extending between said fuel rod spacing grids for establishing a minimum spacing between adjacent fuel rod spacing grids;

fuel rods extending slidably through the fuel rod apertures in said spacing grids, the fuel rod apertures having bearing members for at least initially securing said fuel rods to said spacing grids such that during operation said spacing grids at least initially follow longitudinal expension of said fuel rods;

means for joining one end of each of said fuel rods to one of said end pieces; and at least one spring for urging said spacing grids and spacers towards one of said end pieces for ultimate abutment against said one of said end pieces, said spring being located in a position between said upper and lower end pieces.

2. A fuel assembly in accordance with claim 1, wherein said means for joining one end of each said fuel rods to one of said end pieces comprises:

a cylindrical end fitting on said fuel rod and an annular groove formed in said end fitting;

a bore formed in said one of said end pieces for receiving said end fitting, and an annular groove formed in said bore facing the annular groove formed in said end fitting; and a floating retaining ring engaging the annular grooves.

3. A fuel assembly according to claim 2, wherein said bore is extended by a smaller diameter orifice permitting the circulation of the water.

4. A fuel assembly in accordance with claim 1, wherein:

said spacers are rigid, and which assembly comprises:

a plurality of springs mounted on a central one of said connecting rods, one end of each of said springs engaging said central connecting rod and the other end of each of said springs engaging one of said spacing grids.

5. A fuel assembly in accordance with claim 1, wherein:

said spacers are rigid and are mounted on the connecting rods; and which assembly comprises:

springs mounted on said connecting rods between the lower end piece and a lowermost one of said spacing grids for urging said spacing grids and spacers towards the upper end piece.

6. A fuel assembly according to claim 5 comprising, wherein a compensation spring between the upper grid and the upper end piece.

7. A fuel assembly in accordance with claim 4, wherein:

said rigid spacers are sleeve-like and are mounted on said connecting rods; wherein said grids each comprise two groups of extending perpendicular plates; and wherein each of said rigid spacers includes a central portion slidable on a respective connecting rod and two end parts;

said end parts each terminating in a polygonal section having at least four sides with opposite sides parallel, said spacer end part serving as bearing points on the edges of the plates forming said grids.

8. A fuel assembly according to claim 7, wherein means are provided for preventing a relative rotation of a rigid spacer with respect to the grid.

9. A fuel assembly according to claim 8, wherein the means for preventing a relative rotation of the spacer with respect to the grid are constituted by a tenon joined to the spacer and by a corresponding mortise made in the grid plate.

10. A fuel assembly according to claim 5, wherein:

said rigid spacers are sleeve-like and are mounted on said connecting rods; wherein said grids each comprise two groups of extending perpendicular plates intersecting so as to define said connecting rod apertures in said spacing grids;

each of said rigid spacers includes a central portion slidable on a respective connecting rod and two end parts;

said end parts each terminating in a larger diameter cylindrical section; and the walls of said connecting rod apertures having, in their central portions, a circular curvature having a radius which corresponds to that of said rigid spacer end parts, the ends of the spacers bearing on the curved parts of the grids.

11. A fuel assembly according to claim 10, wherein the curved parts form a complete circle of the same diameter as the circle of the larger diameter part of the rigid spacer.

12. A fuel assembly in accordance with claim 1, wherein:

said spacers are elastic and are mounted on the connecting rods; and which comprises:

springs mounted on the connecting rods between the lower end piece and a lowermost one of said spacing grids for urging said spacing grids and spacers towards the upper end piece.

* * * * *